United States Patent
Farnsworth et al.

[11] Patent Number: 6,101,368
[45] Date of Patent: Aug. 8, 2000

[54] BIDIRECTIONAL EXTERNAL DEVICE INTERFACE FOR COMMUNICATIONS RECEIVER

[75] Inventors: Brad Farnsworth, San Diego; Ray Nuber, La Jolla; Allen Shumate, Poway, all of Calif.

[73] Assignee: General Instrument Corporation, Horsham, Pa.

[21] Appl. No.: 08/812,435

[22] Filed: Mar. 7, 1997

[51] Int. Cl.[7] .............................. H04H 1/00; H04N 7/10; H04N 5/91
[52] U.S. Cl. .............................. 455/3.2; 348/10; 455/6.2; 455/6.3; 386/83
[58] Field of Search .................................... 348/10, 13, 6, 348/906, 7, 12, 14, 15; 455/6.2, 6.3, 4.2, 3.1, 4.1, 5.1; 386/83, 46

[56] References Cited

U.S. PATENT DOCUMENTS

| | | |
|---|---|---|
| 4,599,647 | 7/1986 | George, et al. . |
| 5,046,093 | 9/1991 | Wachob .................................. 455/4.2 |
| 5,550,576 | 8/1996 | Klosterman ................................ 348/6 |
| 5,598,415 | 1/1997 | Nuber et al. ............................ 348/465 |
| 5,612,956 | 3/1997 | Walker et al. ........................... 348/465 |
| 5,657,414 | 8/1997 | Lett et al. ............................ 348/906 X |
| 5,745,161 | 4/1998 | Ito .............................................. 348/15 |
| 5,856,852 | 1/1999 | Huh ...................................... 386/83 X |

FOREIGN PATENT DOCUMENTS

| | | |
|---|---|---|
| 0 540 411 | 5/1993 | European Pat. Off. . |
| 0 749 244 | 12/1996 | European Pat. Off. . |
| WO 96/19895 | 6/1996 | WIPO . |

*Primary Examiner*—John W. Miller
*Attorney, Agent, or Firm*—Barry R. Lipsitz

[57] ABSTRACT

An interface for a communications receiver such as a cable or satellite television receiver allows control between the receiver and an external device. The external device can supplement the services provided by the receiver. The interface includes a bidirectional control port for coupling the external device to the communications receiver. Ports for isochronous data and high speed data are also provided. The external device can simulate commands available via a user interface for the receiver, such as remote control actuations. In this manner, the external device can access information and control the receiver (e.g., to tune to a specific television or data channel) via the bidirectional control port. The interface enables the external device to use the full capabilities of the communication receiver for data acquisition and processing. The acquired and processed data is then delivered to the external device via the interface.

22 Claims, 2 Drawing Sheets

BIDIRECTIONAL EXTERNAL DEVICE INTERFACE FOR COMMUNICATIONS RECEIVER

BACKGROUND OF THE INVENTION

The present invention relates to communications receivers, and more particularly to a bidirectional interface that allows an external device to be controlled by and/or to control a communications receiver such as a satellite or cable television receiver.

Digital transmission of television signals can deliver video and audio services of much higher quality than analog techniques. Digital transmission schemes are particularly advantageous for signals that are broadcast via a cable television network or by satellite to cable television affiliates and/or directly to home satellite television receivers. Examples of such schemes are the MPEG-2 data transmission standard and the DigiCipher® II standard proprietary to General Instrument Corporation of Chicago, Ill., U.S.A., the assignee of the present invention. The DigiCipher® II standard extends the MPEG-2 systems and video standards, which are widely known and recognized as transport and video compression specifications specified by the International Standards Organization (ISO) in Document series ISO 13818. The MPEG-2 specification's systems "layer" provides a transmission medium independent coding technique to build bitstreams containing one or more MPEG programs. The MPEG coding technique uses a formal grammar ("syntax") and a set of semantic rules for the construction of bitstreams. The syntax and semantic rules include provisions for demultiplexing, clock recovery, elementary stream synchronization and error handling. The syntax and semantics of the MPEG-2 transport stream are defined in International Organisation for Standardisation, ISO/IEC 13818-1, International Standard, 1994 entitled "Generic Coding of Moving Pictures and Associated Audio: Systems," recommendation H.222, incorporated herein by reference. It is expected that digital television transmitter and receiver systems will replace existing analog systems just as digital compact discs have largely replaced analog phonograph records in the audio industry.

An advantage of digital transmission techniques is that the television signals can be compressed using various well known compression techniques in order to free up bandwidth in the cable or satellite television spectrum. This bandwidth can be used to provide additional services such as video games (e.g. the Sega® channel), Internet access, automatic control of a video tape recorder or the like, and/or the communication of data (that may or may not be related to the television services) to an external device. Such additional services can provide, for example, an interim solution to the provision of multimedia and interactive television while future technologies that include a merger of television, telephone, and the personal computer (PC) are being developed. Another example of an external device that can take advantage of additional bandwidth is one which monitors what channels are being watched on a user's television, which is useful for monitoring viewership for ratings purposes. In order to successfully implement such external devices for providing additional functions to a consumer, it will be necessary to provide a communication path between the cable or satellite television receiver and the external device.

In particular, it would be advantageous to provide a low-cost, bi-directional serial data port on a communications receiver, such as a "set-top box" that receives television signals from satellite or cable television systems. Such an interface port would enable the communication of data between the communications receiver and one or more external peripherals, such as a personal computer, video player/recorder, video game console, or the like. It would be particularly advantageous if such an interface port enabled signals from the communications receiver to directly control the external device, or vice-versa. It would be still further advantageous to provide an interface that couples the external device to the user interface of the communications receiver. In this manner, an external device would have the ability to initiate functions that are typically controlled by a user.

One use for an interface that provides direct control between a communications receiver and an external device would be to allow a set-top box to receive a television program signal carrying identifying data, and to automatically command a video tape recorder to commence recording the program in response to the identifying data. Other uses would be to enable a video game console to command a set-top box to tune to a particular channel that is carrying a video game service, and to enable an Internet interface to command the set-top box to tune to an Internet access channel. Other uses for such an interface port will become apparent to those skilled in the art once they have knowledge of the present disclosure.

The present invention provides an interface having the aforementioned and other advantages.

SUMMARY OF THE INVENTION

In accordance with the present invention, an interface is provided for a communications receiver that provides services to a user. The interface allows control between the receiver and an external device that supplements the services provided by the receiver. The interface comprises a bidirectional control port for coupling the external device to the communications receiver. Means are provided for passing control data between the external device and the communications receiver via the bidirectional control port. The receiver includes a user interface responsive to first control signals from a user input device for initiating receiver functions. The user interface is also responsive to second control signals received from the external device via the bidirectional port, for initiating a receiver function enabling the external device to supplement a service.

In an illustrated embodiment, the receiver generates third control signals for communication to the external device via the bidirectional port. The third control signals command the external device to carry out an external function. For example, third control signals can be provided to power up a video tape recorder and to command the tape recorder to start recording a program provided by the communication receiver. The receiver and external device can communicate over the bidirectional port using a client-server model.

In another application of the interface, where the communications receiver comprises a television signal receiver, the second control signals can command the television signal receiver to tune to a particular television channel. For example, the external device may comprise a video recorder which commands the television receiver to tune to a particular channel to be recorded. In this manner, a user only needs to program the video recorder to record a particular program, and does not have to worry about also setting a particular channel on his or her set-top box or other television receiver.

In another application for the interface, the external device comprises a video game player. Again, the communications receiver can comprise a television signal receiver which receives video games over a cable or satellite television system. The second control signals can be used to command the television signal receiver to tune to a particular television channel for receiving the video game signals.

DETAILED DESCRIPTION OF THE INVENTION

The present invention provides an extensible application interface for a communication receiver such as a satellite or cable television receiver. The interface enables the receiver to communicate bidirectionally with an external device, such as a video recorder, video game console, or Internet terminal.

In a preferred embodiment, the interface includes three data paths. The first path enables bidirectional communication of control data to and from the external device. Such control data can be used, for example, to enable a satellite television receiver to actuate an external video recorder to record a television program, or to enable the video recorder to actuate the satellite receiver to tune to a particular channel to be recorded. The second path provides "high speed data" (HSD) to the external device, where the communication receiver provides any necessary decoding of the HSD prior to passing it on to the external device. The third path provides isochronous data to the external device, where the communication receiver provides any necessary decoding thereof prior to passing it on to the external device. Isochronous data is useful, for example, in data pipe applications, such as the transport of the contents of a T1 digital data stream (i.e., a telephone data line), business network data, general high speed data communications, and virtually any other data service requiring constant delay data transmission rates that exceed those generally available using asynchronous communication techniques or are not appropriate for variable delay.

The invention will be described herein in connection with a satellite television system. It should be appreciated, however, that the invention is by no means limited to such an implementation. Instead, the invention is applicable to virtually any type of communications receiver, including cable television receivers, personal communicators, cellular telephone receivers, pagers, Internet terminals, and the like.

Figure 1:
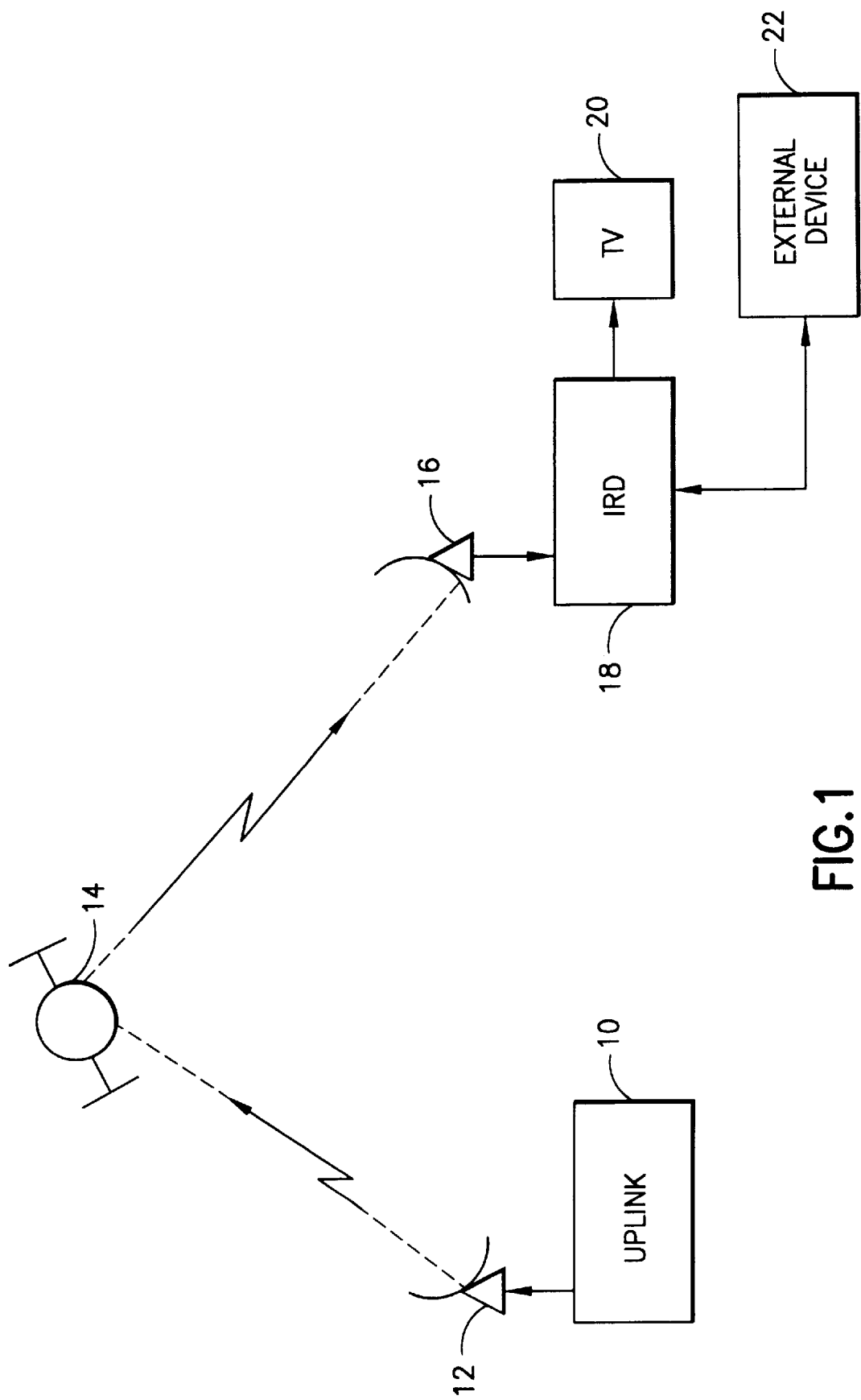
FIG. 1 is a block diagram of a satellite television system having an integrated receiver decoder ("IRD") that implements the present invention.

FIG. 1 illustrates, in block diagram form, a satellite television communication system. Services, such as television programming, are encoded at an uplink 10 and communicated via a satellite transmitting antenna 12 to a satellite 14. The satellite, in turn, communicates the signals to a satellite receiving antenna 16. Each of the antennas 12, 16 is commonly referred to as a "satellite dish."

Signals received by satellite dish 16 are input to a receiver such as an integrated receiver decoder (IRD) 18. The IRD may be a consumer device for reception of direct broadcast satellite (DBS) services. Alternatively, it may be a commercial receiver which is used by a cable television operator or the like to receive signals for redistribution, e.g., along a cable television distribution path. Ultimately, the signals will be output to a television set 20 or other video appliance (such as a video recorder) for use by a subscriber.

In accordance with the present invention, a bidirectional communications port is provided to couple the IRD 18 to an external device 22. The external device can comprise any one of a number of different data receivers/processors. For example, it may be desired to enable the IRD to directly control a video recorder and vice versa. The present invention enables such control via a bidirectional data port with the video recorder coupled as the external device 22. The external device could alternatively comprise a video game console to which video games are downloaded via the IRD 18. The bidirectional port of the present invention can enable the video game console to control the IRD to tune to a particular channel from which the video games are downloaded. It could also command the IRD to power up in order to receive video game signals. The interface of the invention is useful in providing virtually any type of control among and between the IRD and external device.

Figure 2:
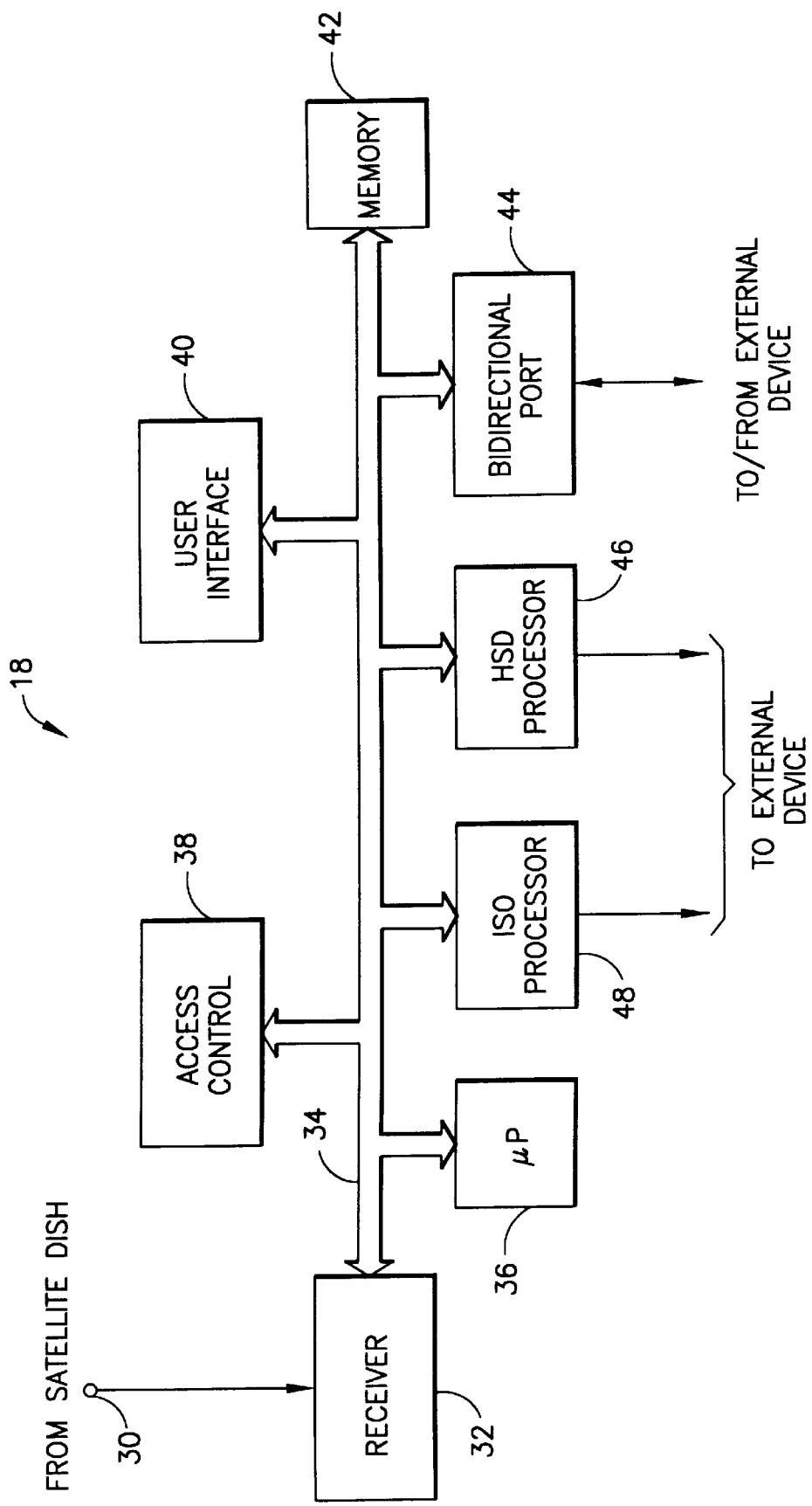
FIG. 2 is a more detailed block diagram of the IRD shown in FIG. 1.

FIG. 2 is a more detailed block diagram of the IRD 18. Signals from the satellite dish 16 are input via terminal 30 to the IRD. The signals are received by a satellite receiver 32 which demodulates and decodes the satellite signals. The receiver is coupled via a conventional data and address bus 34 (which may actually comprise separate data and address paths as well known in the art) to a microprocessor 36. The microprocessor communicates via bus 34 with an access control unit 38, user interface 40, memory 42, and the bidirectional port 44 of the present invention. The microprocessor also communicates with a high speed data (HSD) processor 46 and an isodata processor 48. These processors decode and output HSD and isochronous data in a manner as taught, for example, in commonly assigned U.S. Pat. No. 5,598,415 issued on Jan. 28, 1997 "Transmission of High Rate Isochronous Data in MPEG-2 Data Streams," U.S. patent application Ser. No. 08/678,108 filed Jul. 11, 1996 for "Error Detection and Recovery for High Rate Isochronous Data in MPEG-2 Data Streams," now U.S. Pat. No. 5,742,623 and U.S. patent application Ser. No. 08/573,227 filed Dec. 15, 1995 for "Reformatting of Variable Rate Data for Fixed Rate Communication," now U.S. Pat. No. 5,612,956, all incorporated herein by reference.

Access control unit 38 is a conventional system which contains, for example, a secure microprocessor. This system is responsible for blocking access to services that a subscriber has not paid for. The access can be provided using, e.g., the proprietary Videocipher II system of General Instrument Corporation of Delaware, the assignee of the present application.

User interface 40 is also a conventional system that enables a user to control the IRD 18. The interface can comprise a keyboard and/or other control buttons located on the IRD. The user interface can also include a remote control that enables the user to turn the IRD on and off, select services, and control other functions provided by the IRD.

Memory 42 is used to store data required by the microprocessor 36 and the other subsystems of the IRD. The memory can include both read-only memory (ROM) and random access memory (RAM) as well known in the art.

The bidirectional port 44 of the present invention enables an external device to communicate with microprocessor 36 and thereby, with the other devices, coupled via bus 34. Signals crossing the bidirectional port can also originate with or be targeted for receiver 32, access control 38, user interface 40 and/or memory 42 depending on the particular implementation provided and sophistication of these devices.

Communication of control data via bidirectional port 44 is accomplished using a message protocol. In order to provide an efficient and low cost interface, all message exchanges are conducted on a one-to-one basis between the IRD and the external device. Each message exchange has two parts, the operant and the respondent. The operant is generally a command and the respondent is generally the result. Whenever one party sends an operant, the other party is always obligated to close the exchange by sending a respondent within a specified time-out period (e.g., five seconds). Once message synchronization is obtained, either party (i.e., the IRD or the external device) may initiate an exchange. In a preferred embodiment, the external device will initiate a synchronization communication in order to establish synchronization.

The preferred embodiment uses a sliding window protocol to verify the correct receipt of each message by each party. Such protocols are well known in the art. The value of the sliding window is two in the preferred embodiment. As well known in the art, an N-window protocol generally allows each party to have N messages, either operant or respondent or both, outstanding before the oldest must be acknowledged by the other party. In practice, any party may have only one outstanding operant message of any kind because it may also be holding a respondent message, in which case both messages fill the window limit of two. The sliding window protocol provides a mechanism by which the proper reception of messages can be verified by each party. The following rules can be used for exchanging messages using the sliding window protocol:

Communication Session Initialization

A communication session is started between the IRD 18 and the external device 22 whenever a messaging connection is established. Session Initialization achieves the following:

A. All sliding window variables are reset to their initial values

B. All operant messages in the Last Message Transmitted Queue are considered unacknowledged. The originator of these messages may discard the messages or resubmit them for transmission.

I. Session initialization is explicit and is achieved by exchanging a Sliding Sync message.

A. Whenever either the IRD 18 or the external device 22 is reset or restarted, the first message offered is a Sliding Sync message.

B. If the IRD was reset, then the IRD waits until it receives any message from the external device:

1. If this message is an operant Sliding Sync message, meaning that the external device was also reset, then the IRD sends a respondent Sliding Sync message and synchronization is achieved.

2. If that message is not an operant Sliding Sync message, then the IRD does not acknowledge that message, but instead sends an operant Sliding Sync message. The external device acknowledges this with a respondent Sliding Sync message before it retransmits its original message. Note that the message sequence number (SEQ) and message acknowledgment number (ACK) of that message will be corrected in accordance with the synchronization values.

II. All operations performed on sliding window variables shall use modulo-4 arithmetic. For instance, if the variable ME ("Message Expected"—defined below) is equal to 0, then ME-1 is equal to 3.

III. Each party shall maintain the following information to track the state of the exchange:

A. Next Message to Send: NMS shall specify which message number this party will send next. At session initialization NMS shall be set equal to 0.

B. Message Expected: ME shall specify which message number this party expects next. At session initialization ME shall be set equal to 0.

C. Last Message Transmitted Queue (LMTQ) For a window of size 2, each party shall retain the last 2 messages that it has transmitted until they are acknowledged by the other party.

IV. Two values shall be placed into the link control field of every operant and respondent message:

A. Sequence Number: SEQ shall be a monotonically increasing number assigned to each new message, whether operant or respondent; the number shall not increment for retransmission of the same message. It shall be assigned the current value of NMS.

B. Acknowledgment Number: ACK shall be the value of the last message correctly received by this party. It shall be assigned the value of SEQ in the last message received from the other party. This value will not necessarily increase monotonically, depending on the traffic received from the other party.

V. The first message sent shall have SEQ=0 corresponding to NMS=0, and ACK=−1 corresponding to an acknowledgment of the last (phantom) message from the recipient. This shall be the convention for session initialization. At the same time, the Sender starts a timer that will expire in a predetermined amount of time, e.g., five seconds. If a reply is not received before the time-out, the Sender will retransmit the same message with the same values of SEQ and ACK. Three retransmissions will be attempted before the session is terminated.

VI. Whenever either party transmits a message, it performs the following steps:

A. It shall check whether this would be a retransmission of the given message. If so, it shall verify that it is under the retransmission limit. If the limit has been reached, then the transmission attempt shall be aborted and the session terminated.

B. It shall check whether the number of messages in the LMTQ is less than the window size (e.g., 2). If not, all available messages are outstanding and the party shall wait for a new message from the other party to acknowledge one or more of the outstanding messages, or wait for a time-out on one of those messages.

C. A new message to be sent shall be given SEQ equal to the current value of NMS, and then NMS shall be incremented; it shall also be given ACK equal to ME-1. A retransmitted message shall retain the same SEQ and ACK values that it originally had.

D. If the message corresponds to an operant message, a timer shall be started for it. Respondents shall not be timed; the sender of the operant message shall time the entire transaction.

E. The message shall be saved in the LMTQ.

VII. Whenever either party receives a message, it performs the following steps:

A. It shall compare the received SEQ with its own value of ME:

1. If they match, the recipient shall then increment its value of ME. The next message sent by this party shall have ACK equal to this value of SEQ, which is now ME-1.

2. If SEQ is one less than ME, then the sender is retransmitting this message and the recipient has already processed it. The recipient shall not reprocess the received message, but instead shall return the last transmitted message whose ACK value matches that of the received SEQ.

3. If SEQ is one greater than ME, then the recipient shall detect that a previous message from the other party has been lost. The next message sent by this party shall use ACK equal to the ME-1, which is the last message that the recipient acknowledged. The value of SEQ shall increment normally if the next message is a new message.

4. Otherwise, the two parties are out of synchronization. The recipient shall attempt to resynchronize by restarting the session or by exchanging a Sliding Sync message.

B. It shall compare the received ACK with its own value of NMS:

1. If ACK=NMS-1 or ACK=NMS-2, then all messages sent by this party have been acknowledged. The corresponding messages retained in the LMTQ shall be released and the time-outs for those messages canceled.

2. If ACK is anything else, then the messages that this party sent whose SEQ values fall between the newly received ACK and the previously received ACK have been lost. This party shall then retransmit these messages, subject to the retransmission limit, starting with the oldest message that was lost. Note that if ACK is greater than NMS, then the link is seriously out of synchronization. Retransmission of the oldest messages may be attempted or the session may be terminated.

In the preferred embodiment, the syntax and processing of control data messages over the bidirectional control data port 44 is handled as follows:

Message Syntax

External Device identification (ID) messages will have an operant that includes an external control flag (1 bit) and a program map flag (1 bit). The external control flag indicates that the external device supports external control messages, when set. The program map flag indicates that the external device supports program map messages when set.

Communications receiver identification messages (IRD ID messages) will have a respondent that includes an external control flag (1 bit) and a program map flag (1 bit). The flags indicate whether the IRD supports external control messages and program map messages, respectively, when set.

Application request messages will have an operant with an application ID (16 bit) that associates the device with an application (e.g., a Sega™ video game). If the application ID is non-zero, the IRD will attempt to acquire the lowest virtual channel currently defined which is assigned this application ID.

The external device receives operant data in a field of n octets. The device processes this data according to the needs and purpose of the device. The data are device dependent and can be in any form necessary to be utilized by the device.

A program map defines where the external device can find the data it requires in an incoming high speed data (HSD) or isochronous data stream. This enables the external device to recover timing information (via the program clock reference packet ID (pcr_pid) defined in the map), and application data (such as a Sega™ service) used by the external device, via PID's defined in the map. The map is stored in the communications receiver, and a copy is forwarded by the receiver to the external device for local storage therein. The receiver will also pass updates of the program map to the external device via the bidirectional port. The components of the map are:

pcr_pid to identify the PCR used for timing. These time stamps are used to reconstruct the phase and frequency of the system clock (e.g., 27 MHz) to which all components of the service are aligned. If a service processed by the external device is completely asynchronous, or does not require a pcr_pid (e.g., a text service), this can be indicated by providing a special value in the map instead of a valid pcr_pid value.

component count to indicate the total number of elementary streams listed as components of the current service.

stream type to indicate the type of the component whose PID is associated with the current service.

elementary PID to specify the PID of the transport stream packets carrying the elementary stream whose type is indicated by the "stream type" referred to in the map.

In accordance with one aspect of the invention, the external device can actuate functions in the receiver by outputting signals that simulate user remote control keystrokes. The operant message forwarded from the external device to the receiver comprises a keycode, which in the preferred embodiment is an 8-bit value identifying the actual key to be simulated; a keysource, which is an 8-bit value indicating that the key has been actuated by the external device; and a keystatus, which is an 8-bit value indicating whether an upstroke, down stroke, or repeat action of a remote control key is to be simulated.

Message Processing

The external device identifies itself to the receiver via the external device ID. Upon receipt, the receiver stores the values of the external control and program map flags. The receiver then generates a respondent to the external device ID operant.

The receiver (e.g., IRD) may generate an IRD ID operant. In the event a IRD ID operant is generated by the IRD and received by the external device, the latter will generate an IRD ID respondent and if supported by the IRD, will forward the external control and program map flags indicating whether the external device supports external control messages and/or program map messages.

Upon receipt of an application-request operant from the external device, the IRD will read the accompanying application ID. If the application ID is, e.g., non-zero, the IRD will tune to the virtual channel of the current virtual channel map whose application ID equates to the application ID obtained from the application-request operant. The IRD then generates an application-request respondent after the success or failure of the attempt to locate the requested application is determined. A success code value is provided with the respondent. For example, if the requested application is found (or if the application ID received with the application request operant is zero), the success code can be set to zero; otherwise it is set to a non-zero value.

The IRD may receive hardware control messages (e.g., a VCR control message) from the transport stream which carries, for example, video services. If a hardware control message is received, the IRD generates an external-control operant if the external device's external control flag is set as indicated by the most recently received external device ID operant. The external control operant is generated at the time specified in the hardware control message, and will include a data field specified by the hardware control message.

Upon receipt of a program map request operant, the IRD will schedule generation of a program map request respondent. The program map request respondent is generated upon receipt of the next program map message for the current service received on the transport stream. The fields of the program map request respondent reflect the values received in the corresponding fields of the program map message.

If the program map flag in the most recently received external device ID operant indicates that the external device supports program map messages, the IRD will generate a program map update operant in response to either:

1. a virtual channel change, including those resulting from application requests; or
2. a change in the contents of the most recently received program map message of the current service received from the transport stream.

Upon receipt of a key operant for simulating the actuation of a remote control keystroke, the IRD will respond as if the message's keycode, keysource, and keystatus were received from the remote control.

It should now be appreciated that the present invention provides an interface for a communications receiver in which a bidirectional control port passes control data back and forth between the receiver and an external device. Isochronous data and high speed data can also be communicated via the interface from the communications receiver to the external device. The receiver can receive and store a program map which includes timing information, packet ID information, and a cross-reference useful to the external device for identifying where, inside an isochronous or high speed data stream, particular data required by the external device can be found. A copy of the program map can be loaded from the receiver to the external device, for local storage and use by the external device. When updates to the program map occur, the receiver informs the external device by sending it a program map update. The update can comprise either a copy of the entire updated program map or just the updated information.

The interface of the present invention enables an external device coupled to a communications receiver, to use the full capabilities of the receiver for data acquisition and processing. Once the data acquired and processed by the receiver (e.g., isochronous data or high speed data) is available, it is passed to the external device via the interface.

Control of the communications receiver by the external device is provided by enabling the external device to simulate user remote control commands. These commands, communicated from the external device to the communications receiver via the bidirectional port can be used by the external device to control any desired receiver function, including functions that may not be provided via a user remote control.

Although the invention has been described in connection with a specific embodiment thereof, it should be appreciated that numerous adaptations and modifications may be made without departing from the spirit and scope of the invention as set forth in the claims.

We claim:

1. An interface for providing communication between a television signal receiver that provides television and related services to a user and a co-located peripheral that provides additional services to said user, said interface comprising:

a bi-directional control port for coupling said peripheral to the television signal receiver in order to pass control data between said peripheral and said television signal receiver;

said television signal receiver including:

a user interface responsive to first control signals from a user input device for initiating television functions, said user interface also being responsive to second control signals received from said peripheral via said bi-directional port for initiating a television function;

wherein said receiver generates third control signals for communication to said peripheral via said bi-directional port, said third control signals commanding said peripheral to carry out an external function.

2. An interface in accordance with claim 1 wherein said receiver and peripheral communicate over said bi-directional port using a client-server model.

3. An interface in accordance with claim 2 wherein said peripheral comprises a video recorder.

4. An interface in accordance with claim 3 wherein said second control signals command said television signal receiver to tune to a particular television channel.

5. An interface in accordance with claim 1 wherein said peripheral comprises a video recorder.

6. An interface in accordance with claim 5 wherein said second control signals command said television signal receiver to tune to a particular television channel.

7. An interface in accordance with claim 6 wherein said third control signals command said video recorder to commence recording a television program.

8. An interface in accordance with claim 1 wherein said peripheral comprises a video game player.

9. An interface in accordance with claim 1 wherein said second control signals command said television signal receiver to tune to a particular television channel for at least one of video game and Internet access.

10. An interface in accordance with claim 1 wherein said television signal receiver comprises a cable television set-top box.

11. An interface in accordance with claim 1 wherein said television signal receiver comprises a satellite television set-top box.

12. An interface for coupling an external device to a communications receiver comprising:

a control port for providing bi-directional communication of control data between said external device and said communications receiver;

at least one data port separate from said control port for communicating digital data received by said receiver to said external device; and memory means associated with at least one of said communications receiver and said external device for storing a map enabling the external device to selectively retrieve desired information from said digital data;

said external device (i) communicating with said receiver via said control port to access said map and (ii) receiving said desired information via said data port.

13. An interface in accordance with claim 12 wherein said communications receiver decodes said digital data before passing it to said external device via said data port.

14. An interface in accordance with claim 12 wherein:

said memory means comprise a memory in said receiver for storing said map; and said receiver communicates information from said map to said external device in response to a request from said external device via said control port.

15. An interface in accordance with claim 12 wherein:

said memory means comprise a memory in said external device for storing said map;

said receiver receives and decodes updated map information from said digital data; and said receiver passes said decoded updated map information to said external device.

16. An interface in accordance with claim 15 wherein said memory means further comprise a memory in said receiver for storing said map.

17. An interface in accordance with claim 12 comprising first and second data ports in addition to said bi-directional control port, said first data port communicating isochronous data to said external device and said second data port communicating high speed data to said external device.

18. An interface in accordance with claim 12, wherein said receiver includes a user interface responsive to first control signals from a user input device for initiating receiver functions, said user interface also being responsive to second control signals received from said external device via said bi-directional port for initiating a receiver function.

19. A method for supplementing the functions provided by a television signal receiver comprising the steps of:

coupling a peripheral to said receiver via a bi-directional control port and at least one data port which is separate from said bi-directional control port;

establishing a communication between said receiver and said peripheral via said bi-directional control port, providing a control signal from said peripheral to said receiver via said bi-directional port;

providing a data stream to said receiver for receiving and decoding data therefrom; and communicating data received and decoded by said receiver to said peripheral via said data port in response to said control signal provided by said peripheral via said bi-directional control port.

20. A method in accordance with claim 19 comprising the further steps of:

simulating a user interface command in said peripheral; and communicating said simulated user interface command to said receiver via said bi-directional control port to initiate an action in said receiver.

21. An method in accordance with claim 19 wherein said television signal receiver comprises one of a cable television and satellite television set-top box.

22. An interface for providing communication between a television signal receiver that provides television and related services to a user and a co-located peripheral that provides additional services to said user, said interface comprising:

a bi-directional control port for coupling said peripheral to the television signal receiver in order to pass control data between said peripheral and said television signal receiver;

said television signal receiver including:

a user interface responsive to first control signals from a user input device for initiating television functions, said user interface also being responsive to second control signals received from said peripheral via said bi-directional port for commanding said television signal receiver to tune to a particular television channel.

* * * * *